(12) United States Patent
Merkel et al.

(10) Patent No.: US 9,931,889 B2
(45) Date of Patent: Apr. 3, 2018

(54) WIDTH-ADJUSTABLE HEAVY-GOODS VEHICLE

(71) Applicant: GOLDHOFER AG, Memmingen (DE)

(72) Inventors: Felix Merkel, Memmingen (DE); Horst Haefele, Babenhausen (DE)

(73) Assignee: GOLDHOFER AG, Memmingen (DE)

( * ) Notice: Subject to any disclaimer, the term of this patent is extended or adjusted under 35 U.S.C. 154(b) by 0 days.

(21) Appl. No.: 15/118,552

(22) PCT Filed: Feb. 11, 2015

(86) PCT No.: PCT/EP2015/052849
§ 371 (c)(1),
(2) Date: Aug. 12, 2016

(87) PCT Pub. No.: WO2015/121292
PCT Pub. Date: Aug. 20, 2015

(65) Prior Publication Data
US 2017/0043622 A1 Feb. 16, 2017

(30) Foreign Application Priority Data
Feb. 14, 2014 (DE) .......... 10 2014 202 724

(51) Int. Cl.
*B60B 35/10* (2006.01)
*B60B 35/00* (2006.01)
(Continued)

(52) U.S. Cl.
CPC ........ *B60B 35/1072* (2013.01); *B60B 35/005* (2013.01); *B60B 35/007* (2013.01);
(Continued)

(58) Field of Classification Search
CPC ... B60B 35/1072; B60B 35/007; B60B 37/02; B60B 35/005; B60B 35/10;
(Continued)

(56) References Cited

U.S. PATENT DOCUMENTS 4,119,224 A * 10/1978 Moody .............. B60P 3/07
280/656
5,419,577 A * 5/1995 Murray ............. B60P 3/06
280/656

(Continued)

FOREIGN PATENT DOCUMENTS

| DE | 2219447 | 12/1973 |
|---|---|---|
| DE | 10115631 | 12/2002 |
| DE | 20 2006 020992 | 12/2011 |
| DE | 20 2012 011898 | 3/2013 |
| DE | 102012024247 | 6/2014 |

(Continued)

OTHER PUBLICATIONS

PCT Search Report for PCT/EP2015/052849.
German Office Action in DE 10 2014 202 724.1.

*Primary Examiner* — Drew J Brown
(74) *Attorney, Agent, or Firm* — Greenblum & Bernstein, P.L.C.

(57) ABSTRACT

A heavy goods vehicle (10) having a vehicle frame (12) and at least one driving axis (A), which has on either longitudinal side (10a) of the vehicle (10) a bogie (22) comprising a wheel assembly (14), each wheel assembly (14) comprising at least two wheels arranged symmetrically in relation to a central axis (S), and a wheel suspension (18) by means of which said wheel assembly is fastened to a rotary plate (28) of the bogie (22), this rotary plate (28) being mounted on a rotary bearing (24) of the bogie (22) which is engaged with the vehicle frame (12) so as to be rotatable about a steering swivel axis (X). According to the invention, the rotary bearing (24) of the bogie (22) can be adjusted in the width direction (B) of the vehicle relative to the vehicle frame (12) and can be detachably connected to the vehicle frame (12) in an operationally stable manner.

20 Claims, 13 Drawing Sheets

(51) Int. Cl.
*B60B 37/02* (2006.01)
*B60B 11/00* (2006.01)

(52) U.S. Cl.
CPC .......... *B60B 35/10* (2013.01); *B60B 35/1054* (2013.01); *B60B 37/02* (2013.01); *B60B 11/00* (2013.01); *B60B 2310/302* (2013.01); *B60B 2360/102* (2013.01); *B60B 2380/10* (2013.01); *B60B 2900/112* (2013.01); *B60B 2900/351* (2013.01); *B60B 2900/711* (2013.01); *B60Y 2200/142* (2013.01)

(58) Field of Classification Search
CPC ................ B60B 35/1054; B60B 11/00; B60B 2360/102; B60B 2310/302; B60B 2380/10; B60B 2900/112; B60B 2900/351; B60B 2900/711; B60Y 2200/142
See application file for complete search history.

(56) References Cited

U.S. PATENT DOCUMENTS

| | | | |
|---|---|---|---|
| 6,120,235 A * | 9/2000 | Humphries | B60P 3/12 280/656 |
| 2007/0264110 A1 | 11/2007 | Rhodes et al. | |
| 2009/0067952 A1 | 3/2009 | Rhodes et al. | |
| 2014/0041962 A1* | 2/2014 | Borghi | B60B 35/10 182/63.1 |
| 2015/0284041 A1* | 10/2015 | Kern | B60G 7/02 280/441.2 |
| 2016/0009135 A1* | 1/2016 | Jong | B60B 35/10 280/5.52 |
| 2016/0236709 A1* | 8/2016 | Faymonville | B60B 35/10 |

FOREIGN PATENT DOCUMENTS

| | | |
|---|---|---|
| WO | WO00/64700 | 11/2000 |
| WO | WO 07/134104 | 11/2007 |

* cited by examiner

WIDTH-ADJUSTABLE HEAVY-GOODS VEHICLE

The invention relates to a heavy goods vehicle comprising a vehicle frame and at least one driving axis, which has on either longitudinal side of the vehicle frame a bogie comprising a wheel assembly, each wheel assembly comprising at least two wheels arranged symmetrically in relation to a central axis, and a wheel suspension by means of which said wheel assembly is fastened to a rotary plate of the bogie, this rotary plate being mounted on a rotary bearing of the bogie which is engaged with the vehicle frame so as to be rotatable about a steering swivel axis.

Heavy goods vehicles of this type are generally known and have been successfully sold by the applicant for many years. In particular in view of the specific licensing and operating requirements in the USA and Australia, the applicant has also developed heavy goods vehicles that have a vehicle frame that is divided up in the longitudinal central plane of the vehicle so that the vehicle width can be set to a desired value by arranging connector units, which extend in the vehicle width direction, between the left and right vehicle modules. In this way, vehicles can be 4270 mm (14 ft.), 4880 mm (16 ft.), 5490 mm (18 ft.) and 6100 mm (20 ft.) wide, for example. The vehicle width which is favourable in each case is determined by the particular nature of the transport request in question and by the particular load to be transported. The applicant's aforementioned heavy goods vehicles comprising a vehicle frame which is divided up in the longitudinal central plane of the vehicle provide the vehicle operator with the option of disassembling the two parts of the vehicle frame and fitting a width adapter between said two parts that is designed for the desired vehicle width in each case. Of course, this alteration does however involve work time and therefore incurs costs.

The object of the present invention is therefore to provide a heavy goods vehicle of the type mentioned at the outset, the vehicle width of which can be modified rapidly and thus in a cost-effective manner.

This object is achieved according to the invention by a heavy goods vehicle of the type mentioned at the outset in which the rotary bearing of the bogie can be adjusted in the width direction of the vehicle relative to the vehicle frame and which can be connected to the vehicle frame in an operationally stable, and yet detachable, manner.

In principle, it is conceivable for the rotary bearing to be fastened to an adapter plate, which is adjustably guided in a linear guide which is fastened to the vehicle frame and extends in the width direction, and for it to be possible for said rotary bearing to be detachably connected to said adapter plate in a plurality of positions and in an operationally stable manner. In a development of the invention, it is however proposed that the rotary bearing is fastened to an adapter plate which is mounted on the vehicle frame so as to be rotatable about an adjustable axis of rotation, the central axis being arranged to be offset from the steering swivel axis in the width direction of the vehicle by one predetermined non-zero distance, and the adjustable axis of rotation being arranged to be offset from the steering swivel axis in the width direction of the vehicle by another predetermined non-zero distance. An additional bogie may be provided for rotatably mounting the adapter plate to the vehicle frame. The design based on the use of bogies is advantageous over the design mentioned at the outset which is based on linear guides in that bogies are closed systems in which the guide portions of the rotary plate and rotary bearing, respectively, are opposite one another over the whole circular guide length, whereas, in a linear guide, a large portion of the guide length never has anything opposite it. Therefore, bogies are less susceptible to becoming soiled. Bogies are also advantageous in that they are very mechanically stable even for high loads.

In order to allow the largest possible number of width adjustments to be made, in a development of the variant comprising the two bogies, the one predetermined distance and the other predetermined distance are different from one another. Assuming that the two wheel assemblies which are assigned a common driving axis are identical, even if they are arranged in mirror symmetry in relation to the longitudinal central plane of the vehicle, and are always set to the same width position, the heavy goods vehicle can be adjusted to a total of four vehicle widths in this manner.

In a development of this embodiment, the other predetermined distance is double the length of the one predetermined distance. For example, the other predetermined distance can be approximately 305 mm (1 ft.), while the one predetermined distance can be approximately 152.5 mm (½ ft.). If the minimum vehicle width is 4270 mm (14 ft.), the vehicle width can in this case be provided to be 4270 mm (14 ft.), 4880 mm (16 ft.), 5490 mm (18 ft.) and 6100 mm (20 ft.).

In a development of the invention, a rotation stop element is associated with one of the elements of the one bogie, namely the rotary plate or the rotary bearing, and at least one counter rotation stop element is associated with the other of the elements of the one bogie, namely the rotary bearing or the rotary plate. As a result of the rotation stop element interacting with the at least one counter rotation stop element, it is possible to prevent the rotary plate from rotating relative to the rotary bearing through any angle; instead said rotary plate is permanently kept within an angular range of rotation that is at most 360°. In this way, it is possible to prevent supply lines to the wheel assembly in question, for example supply lines to a brake system of the wheel assembly or supply lines to a hydraulic power unit of the wheel suspension of the wheel assembly, from becoming damaged as a result of unimpeded rotation through an angle of rotation of greater than 360°. By way of example, the angular range of rotation can be between approximately 300° and 360°, for example 330°.

It can also be provided that the additional bogie can be locked in two relative rotational positions of the rotary plate and rotary bearing, respectively. These two relative rotational positions are preferably separated from one another by 180°, it being possible for the one bogie to be arranged at the innermost position, when viewed in the vehicle width direction, in one of the relative rotational positions of the additional bogie, and, conversely, it being possible for the one bogie to be arranged in the outermost position, when viewed in the vehicle width direction, in the other relative rotational position of the additional bogie. As a result, it is ensured that, when in the driving mode, it is only the one bogie that can be used for steering the wheel assembly.

In a development of the invention, the adapter plate comprises a through-opening and a guide element is arranged on the surface of the adapter plate facing the one bogie. Owing to the through-opening, the aforementioned supply lines to the wheel assembly can be guided from the vehicle frame, through the inside of the additional bogie, and through the through-opening into the inside of the one bogie, where they can continue around the guide element and on to the points for connection to the wheel assembly. In this case, the guide element ensures in particular that the course of the supply lines is correct, even if both the one bogie and the additional bogie are rotated by 180° in the same rotational direction so as to modify the vehicle width. Although the first of these rotations does not pose any problems given that it only requires the supply lines to curve by 180°, the second of these rotations requires a loop to be formed. Moreover, so as to be able to correctly form this loop, it is advantageous for there to be a guide element against which the supply lines can be placed so as to determine the position and/or shape of the loop.

The fact that additional supply line lengths are required in order to form the loop means that it is advantageous for a length adjustment path to be provided in the vehicle frame for the at least one supply line.

Furthermore, the at least one supply line can be prestressed into the length adjustment path in order to prevent the at least one supply line from getting stuck in the region of the two bogies and the adapter plate. For this purpose, a tension spring for example may be provided which acts on the at least one supply line at one of its ends and acts on the vehicle frame at its other end.

In order to prevent the at least one supply line from getting stuck in the region of the two bogies and the adapter plate, it is also advantageous for the adjustable axis of rotation of the additional bogie to extend through the through-opening in the adapter plate and/or for the steering swivel axis to extend through the surface surrounded by the guide element and/or for the through-opening in the adapter plate and a through-opening in the vehicle frame which leads from the inside of the additional bogie towards the length adjustment path to overlap one another in the vehicle vertical direction.

It should also be noted that, if the guide element is formed by a plate which extends in a curved manner, the surface which is surrounded by the guide element is any surface which would be surrounded by a rubber band which, in a thought experiment, is placed under tension around the outer surface of the curved guide plate.

In order to produce the adapter plate in a simple manner, it is proposed that the adapter plate be manufactured from at least two plates that are welded together.

For example, the one plate can be intended for attaching the full surface of the rotary bearing of the one bogie, whereas the other plate can be intended for attaching the full surface of the rotary plate of the additional bogie. Owing to the offset of the two bogies, the two plates do not necessarily have to have same surface extension; instead, it is sufficient for said plates to overlap at least to the same extent as the bogies.

In order to effectively forward the forces from the one bogie originating from the wheel assembly to the additional bogie by means of the adapter plate, it is advantageous for the plate associated with the additional bogie to also extend, on the side on which the one bogie protrudes beneath the additional bogie, at least in part beyond the one bogie. In order to make the adapter plate more rigid, at least one stiffening rib may also be provided that is raised on the upper surface of the two plates. In this way, the adapter plate can be formed so as to be lightly, but nevertheless sufficiently rigid.

It should also be noted that, when the heavy goods vehicle is in the driving mode, the central axis of the wheels belonging to a common wheel assembly, the steering swivel axis, and the adjustable axis of rotation preferably extend substantially orthogonal to the road surface.

It should also be noted that the heavy goods vehicle according to the invention can be both a non-powered vehicle, which can be moved by at least one towing vehicle and/or pusher to which said vehicle can be connected by a conventional drawbar, a fifth-wheel coupling, or a towing bar or pusher rod, and a self-propelled vehicle, for example a self-propelled vehicle of which the wheel assemblies can be equipped with hydrostatic drive units.

In the following, the invention will be explained in more detail on the basis of an embodiment with reference to the accompanying drawings, in which.

In FIGS. 1 to 4, a heavy goods vehicle according to the invention is very generally denoted by reference sign 10. The heavy goods vehicle 10 comprises a vehicle frame 12 and a driving axis A which extends in the vehicle width direction B and has a wheel assembly 14 on each of the longitudinal sides 10a of the heavy goods vehicle 10. In the views in each of FIGS. 1 to 4, just one of these wheel assemblies 14 is shown because the basic design of the applicant's heavy goods vehicle is well known to a person skilled in the art from the applicant's many publications. Furthermore, in FIG. 1, the vehicle longitudinal direction is denoted by reference sign L and the vehicle vertical direction is denoted by reference sign H.

Figure 1:
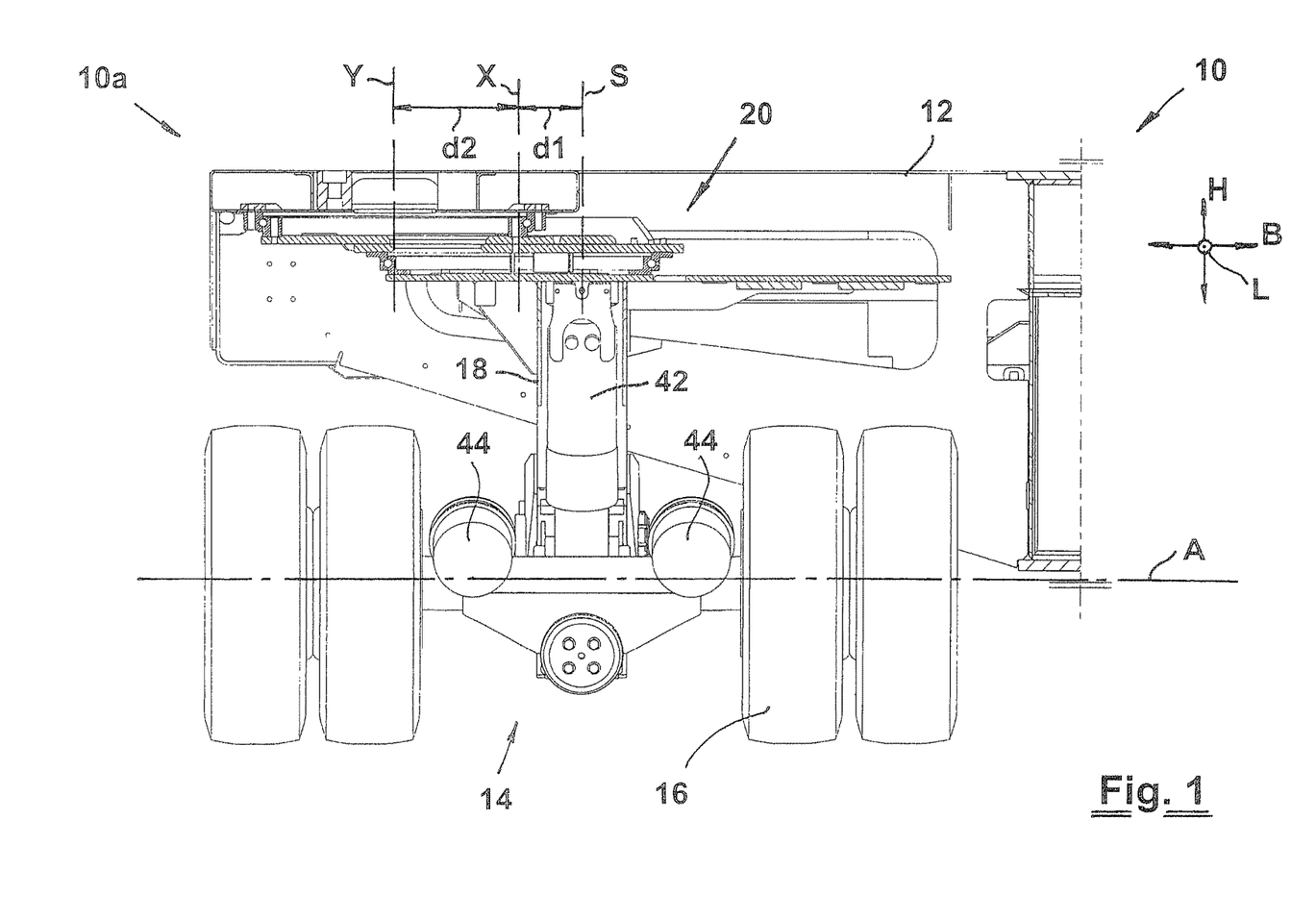
FIGS. 1 to 4 are sectional views of a heavy goods vehicle according to the invention, the wheel assemblies of which are adjusted according to four different width adjustments.

The wheel assembly 14 comprises wheels 16 and a wheel suspension 18 which can be operated in a fluid, preferably hydraulic, manner and the design of which is also known per se to a person skilled in the art from the applicant's heavy goods vehicles. The wheel suspension 18 is rotatably mounted on the vehicle frame 12 by means of an adjustment arrangement 20. Even though each wheel assembly 14 comprises four wheels 16 in the embodiment shown, at this juncture, it is pointed out that the invention is not limited to this number. Similarly, at least some of the wheel assemblies may even have just two wheels.

In the following, the design of the adjustment arrangement 20 will be described in more detail with reference to FIGS. 5 to 7.

The adjustment arrangement 20 comprises a first bogie 22 comprising a rotary plate 28 which is rotatably mounted on a rotary bearing 24, for example by means of a ball bearing 26, a second bogie 30 comprising a rotary plate 36 which is rotatably mounted on a rotary bearing 32, for example by means of a ball bearing 34, and an adapter plate 38 which interconnects the two bogies 22, 30.

The wheel assembly 18 is fastened to the rotary plate 28 of the first bogie 22. Furthermore, the rotary bearing 24 of the first bogie 22 and the rotary plate 36 of the second bogie 30 are rigidly interconnected by means of the adapter plate, and the rotary bearing 32 of the second bogie 30 is fastened to the vehicle frame 12.

By rotating the first bogie 22 about the axis of rotation X thereof, when the heavy goods vehicle 10 is in the driving mode, the wheel assembly 14 can be steered so as to bring about changes to the direction of the heavy goods vehicle 10. For example, a steering angular range of ±60° of adjustment to the angle of rotation of the first bogie relative to a straight line of travel can be provided. The axis of rotation X of the first bogie 22 is therefore referred to as the steering swivel axis in the following.

Figure 5:
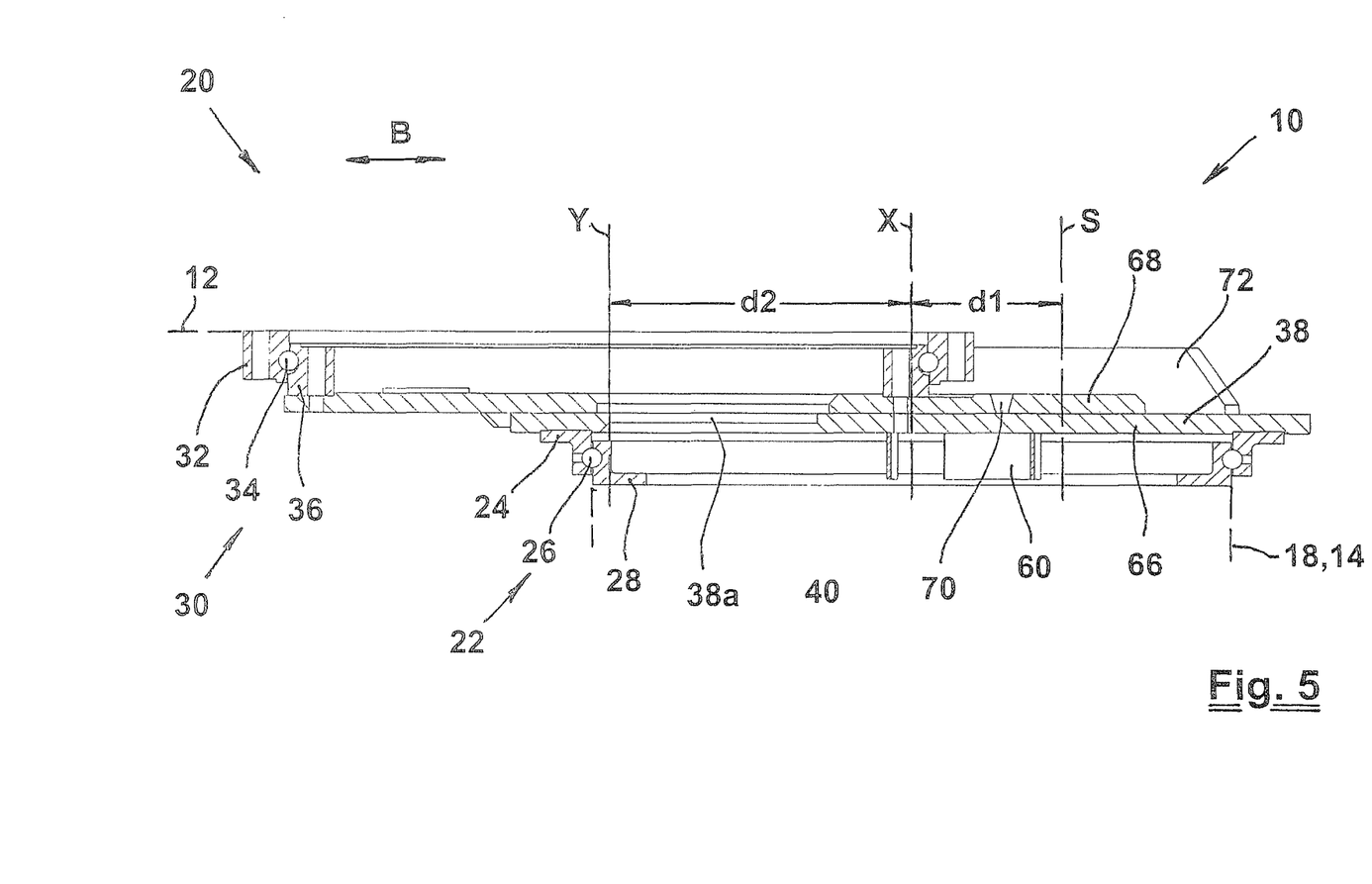
FIG. 5 is a sectional view of the adjustment arrangement which makes the four different width adjustments possible and which comprises the two bogies and the adapter plate.

As shown in FIGS. 1 and 5, the axis of symmetry S of the wheel assembly 14, in particular of the wheel suspension 18, and the steering swivel axis X of the first bogie 22 are at a distance d1 from one another. In particular, in the view of FIG. 1, the axis of symmetry S is arranged within the steering swivel axis X in relation to the vehicle width direction B. If the rotary plate 28 of the first bogie 22 is rotated relative to the associated rotary bearing 24 by 180° about the steering swivel axis X, the wheel assembly 14 moves outwards in the vehicle width direction B by the distance 2·d1, and therefore a second width adjustment of the heavy goods vehicle 10 is made, which is shown in FIG. 2.

Figure 2:
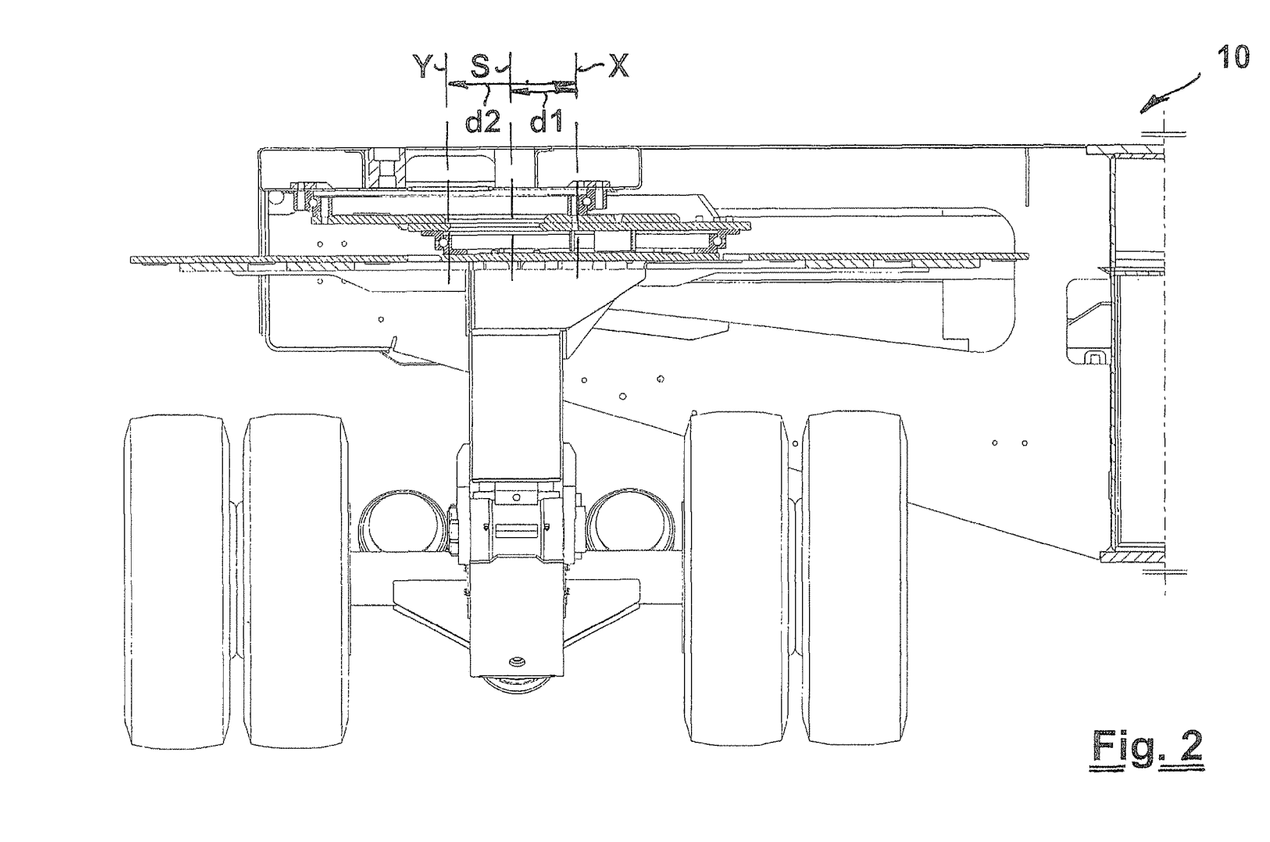

Furthermore, the axis of rotation X of the first bogie 22 and the axis of rotation Y of the second bogie 30 are at a distance d2 from one another, the axis of rotation X being arranged, in the views in FIGS. 1 and 2, within the axis of rotation Y in the vehicle width direction B.

Figure 3:
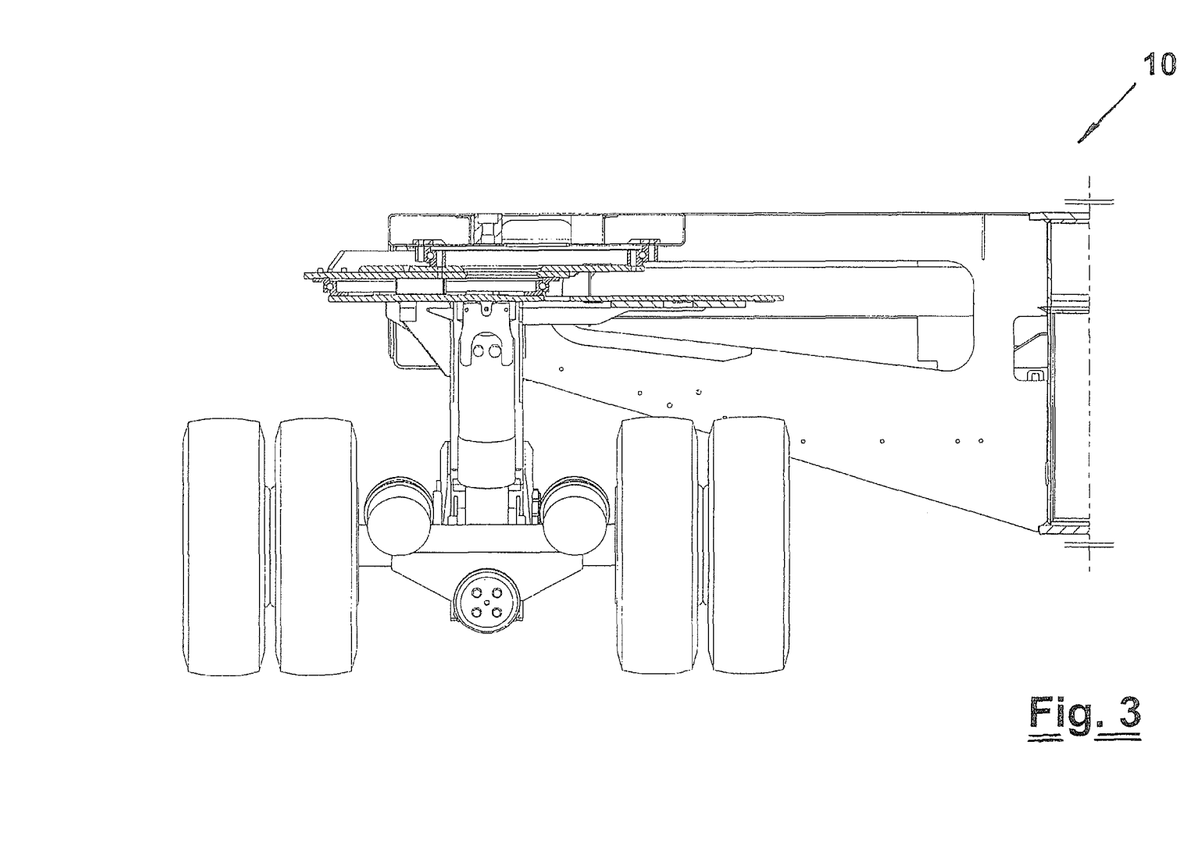

If the rotary plate 36 of the second bogie 30 is rotated from the width adjustment of FIG. 2 relative to the associated rotary bearing 32 by 180° about the axis of rotation Y, the wheel assembly 14 moves outwards in the vehicle width direction B by the distance 2 (d2−d1), and therefore a third width adjustment of the heavy goods vehicle 10 is made, which is shown in FIG. 3.

Figure 4:
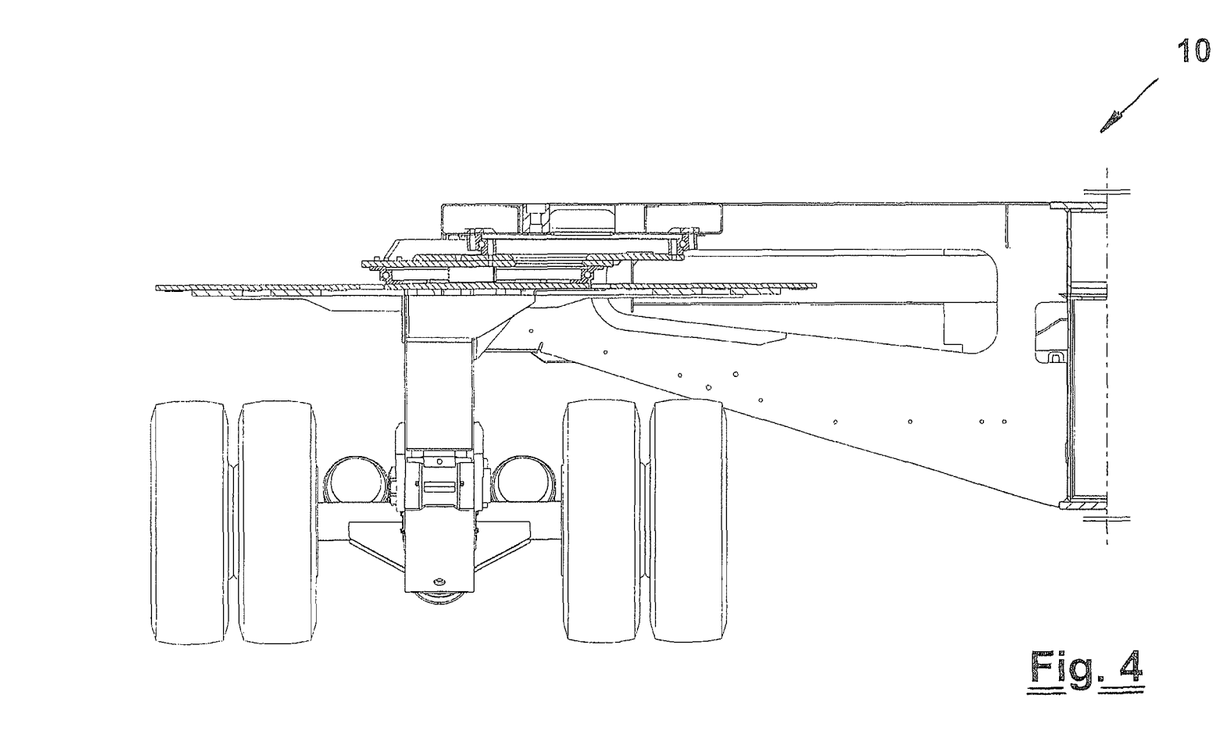

In a similar way, a fourth width adjustment of the heavy goods vehicle 10, as shown in FIG. 4, is made if the rotary plate 36 of the second bogie 30 is rotated from the width adjustment of FIG. 1 relative to the associated rotary bearing 32 by 180° about the axis of rotation Y so that the wheel assembly 14 moves outwards in the vehicle width direction B by the distance 2·(d2+d1).

If the distance d2 is double the length of distance d1 (d2=2·d1), as is the case in the embodiment shown in FIGS. 1 to 4, four equidistant width adjustments of the wheel assembly 14 are made in this way. If, in the first instance, the distance d1 is 152.5 mm (½ ft.) and the distance d2 is 305 mm (1 ft.), if, in the second instance, the vehicle width in the narrowest width adjustment is 4270 mm (14 ft.) and if, in the third instance, the left and right wheel assemblies 14 are adjusted to the same extent in each case, then the following vehicle widths can be provided: 4270 mm (FIG. 1), 4880 mm (FIG. 2), 5490 mm (FIG. 3) and 6100 mm (FIG. 4).

Taking into account the aforementioned options of rotating the wheel assembly 14 about the axes of rotation X and Y by means of the bogies 22, 30 in order to provide four different width adjustments and of also rotating said wheel assembly about the axis of rotation X over a steering angular range of ±60° by means of the bogie 22 in order to make the heavy goods vehicle steerable, it is particularly challenging to meet the requirement for operating fluid supply lines 40, one of which is indicated by a dashed line in FIG. 5, to be guided to the wheel assembly 14, for example in order to supply a power unit 42 of the wheel suspension 18, a braking system 44 or a drive apparatus (not shown) of a self-propelled heavy goods vehicle. Specifically, damage to these supply lines 40 resulting from excessive rotation needs to be prevented and/or the opening cross section of said lines needs to be prevented from becoming too heavily constricted as a result of clamping or the like.

Figure 8:
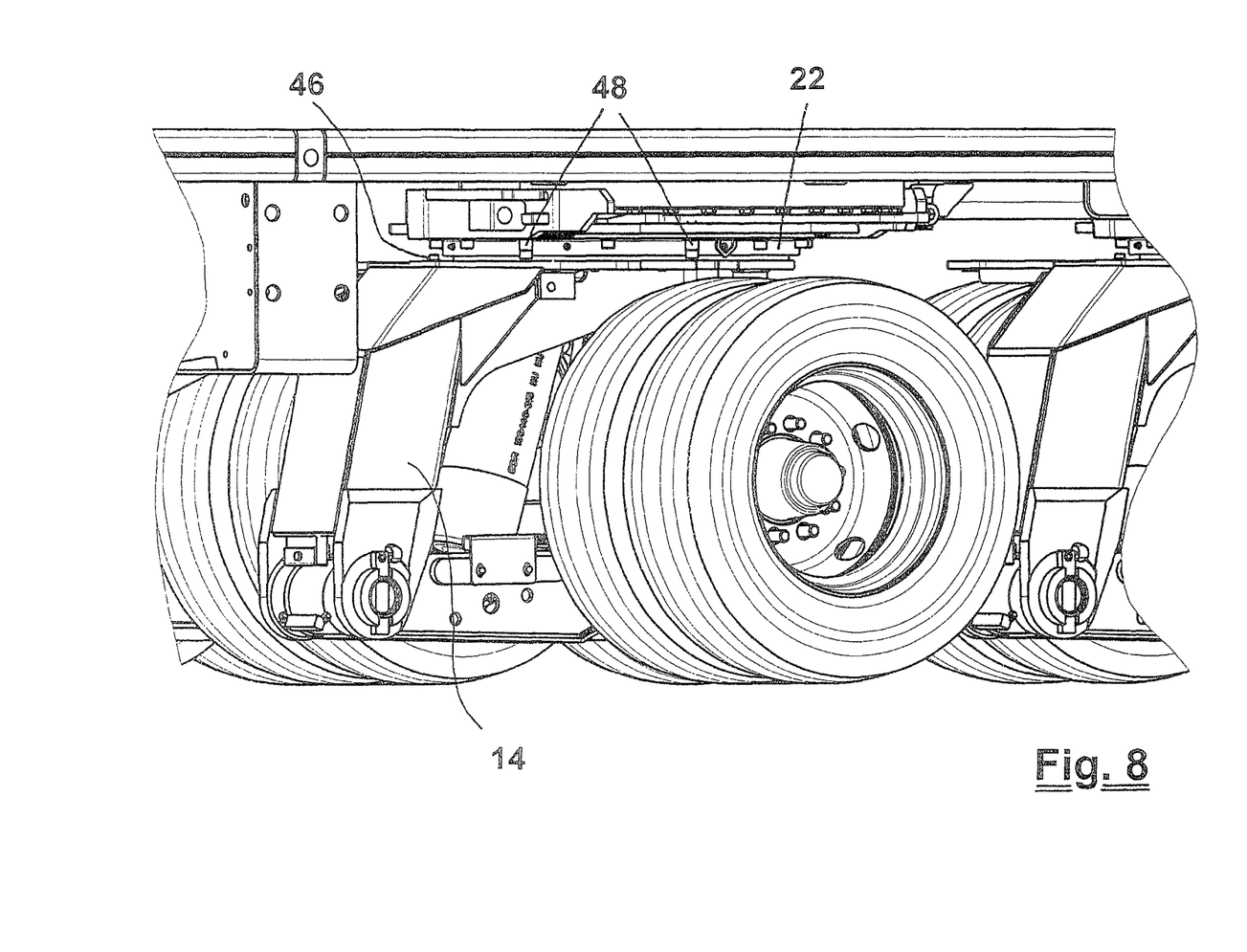
FIG. 8 is a perspective view showing the limits on the angle of rotation of the one bogie.

To this end, the embodiment shown in the figures involves two precautionary measures:

Firstly, FIG. 8 shows that a stop bolt 46 is associated with the rotary plate 28 of the first bogie 22 and can be arranged for example on the wheel assembly 14 which is rigidly connected to the rotary plate 28. This stop bolt 46 engages with two counter stop bolts 48 which are associated with the rotary bearing 24 of the first bogie 22 and are for example formed by elongate fastening bolts which are used to fasten the rotary bearing 24 to the adapter plate 38. The positions of these counter stop bolts 48 may be selected for example such that the first bogie 22 can be rotated over an angular range of rotation of at least 300°.

Figure 9:
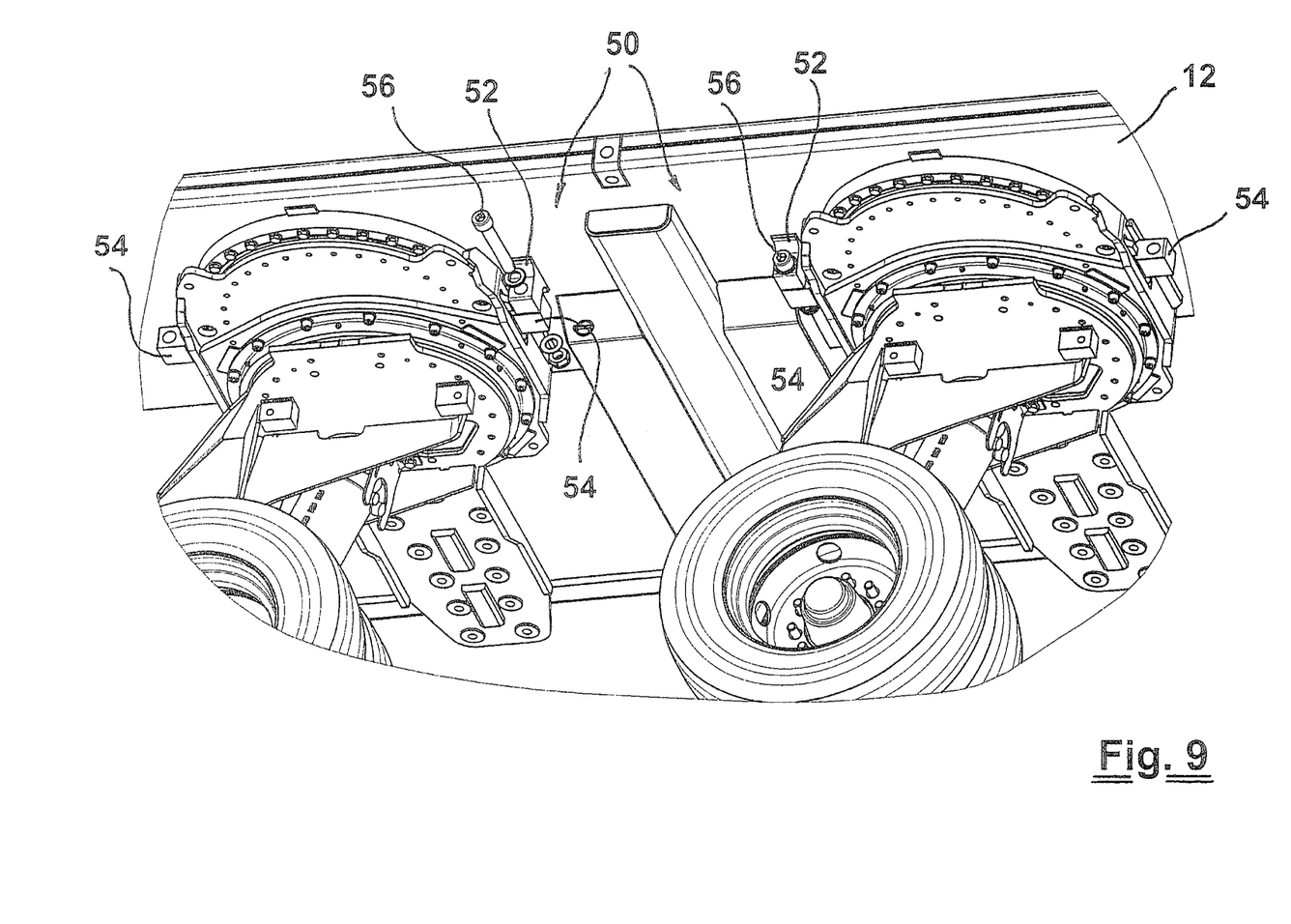
FIG. 9 is a perspective view showing the locking of the additional bogie when the heavy goods vehicle is in the driving mode.

Secondly, FIG. 9 shows that the rotary plate 36 and the rotary bearing 32 of the second bogie 30 can be rigidly interconnected by means of a locking device 50. The locking device 50 comprises a locking block 52 which is fastened to the vehicle frame 12, and two counter locking blocks 54 which are fastened to the rotary plate 36, which blocks can be bolted together by means of a locking bolt 56. This makes it possible, when the heavy goods vehicle is in the driving mode, to prevent additional degrees of freedom of movement from occurring that make it more difficult, or even impossible, to steer the wheel assemblies 14 in a targeted manner by rotating the first bogie 22.

As a result of the interaction between the rotary stop according to FIG. 8 and the locking mechanism according to FIG. 9, the maximum angle of rotation by which the operating fluid supply lines 40 are rotated can be limited to 480°, i.e. a rotation by 180° of each of the two bogies 22, 30 so as to adjust width plus a rotation by ±60° of the first bogie 22 for steering purposes.

Figure 10:
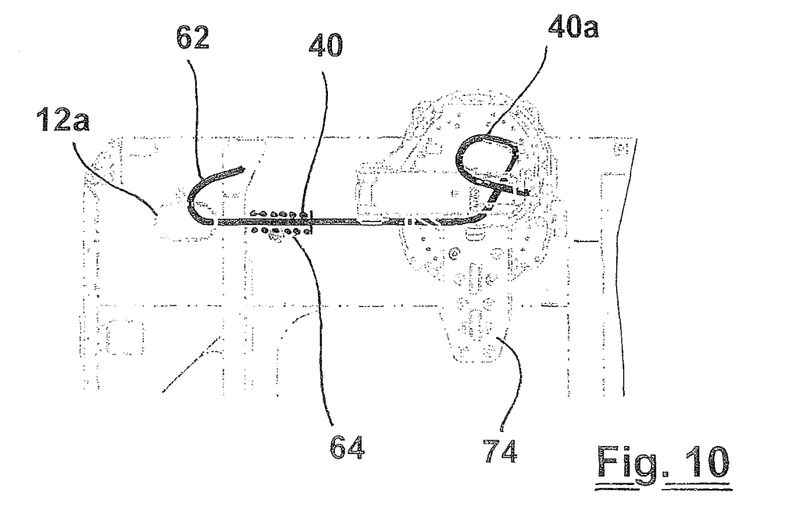
FIGS. 10 and 11 are a bottom view and a side view, respectively, of the heavy goods vehicle according to the invention, showing the course of the operating fluid supply lines to the wheel assemblies.
Figure 11:
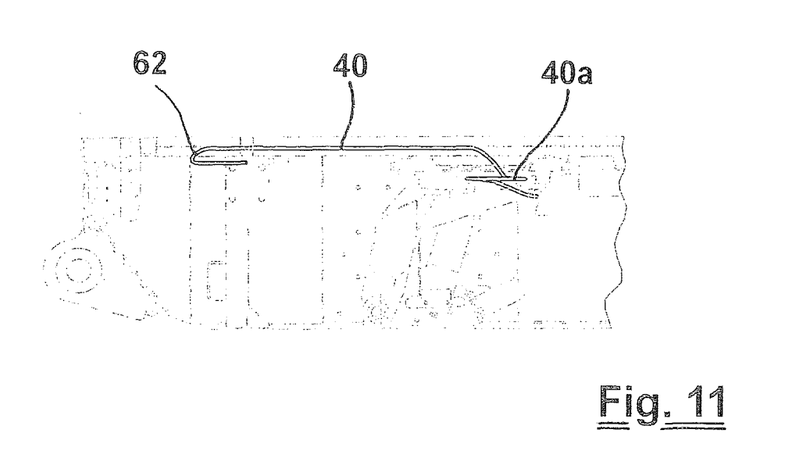
Figure 12A:
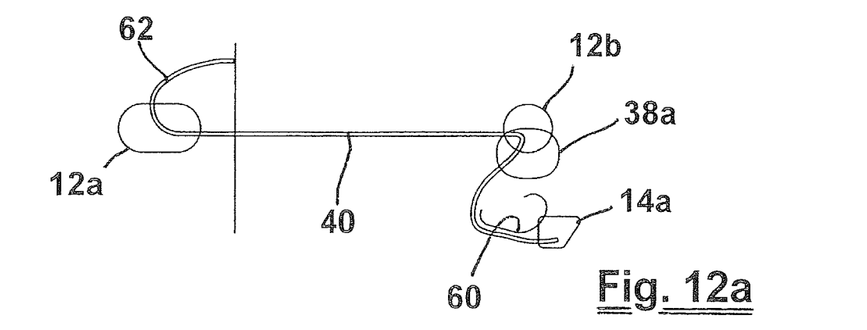
FIGS. 12a to 12d are highly schematic views showing the change to the course of the operating fluid supply lines when changing between the four different width adjustments.
Figure 12B:
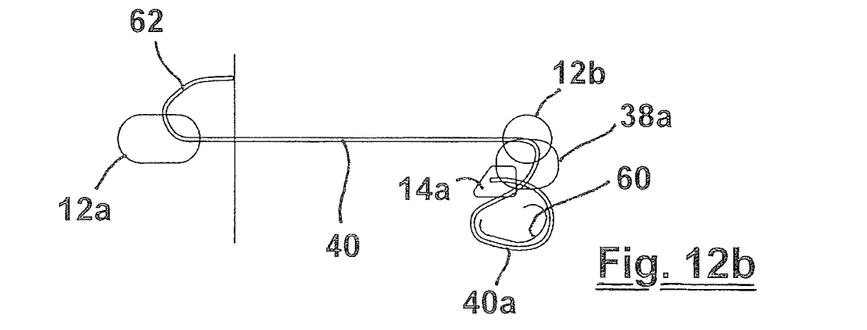
Figure 12C:
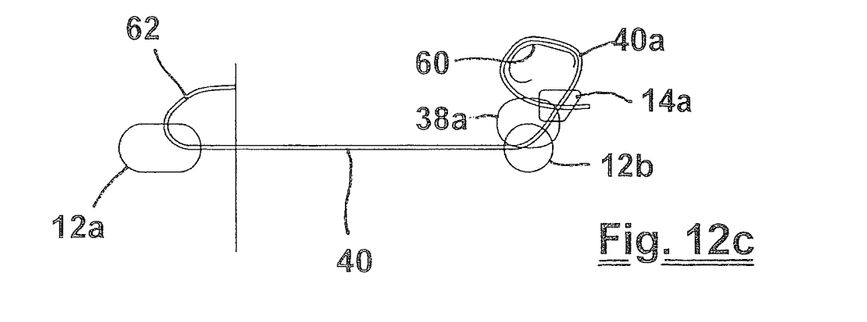
Figure 12D:
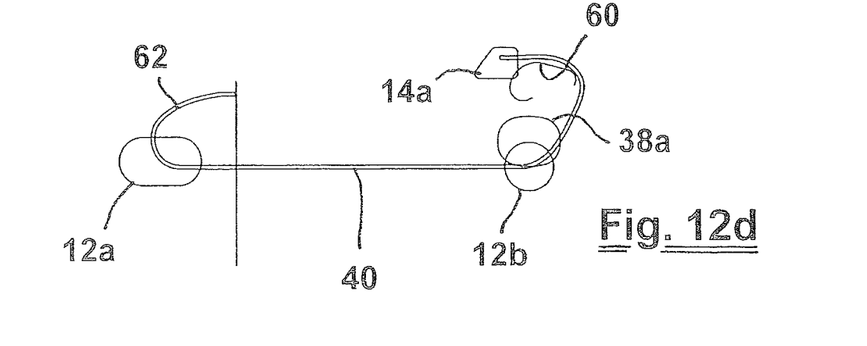

Since a rotation by 480° about the longitudinal axis of the supply lines 40 would result in a high risk of the supply lines 40 becoming damaged, it is provided according to the invention that the supply lines 40, just one of which is shown in each of FIGS. 10, 11 and 12a to 12d for the sake of clarity, are guided such that, when required, they form a 360° loop 40a, as can be seen for example in FIG. 10, and also in FIGS. 12b and 12c. In order to ensure that this 360° loop 40a can be formed in a reproducible manner, as can be best seen in FIG. 5, a guide element 60 is provided on the surface of the adapter plate 38 facing the first bogie 22, around which guide element the supply line 40 can be placed when forming the 360° loop. In the embodiment shown, the guide element 60 is formed by a curved plate, the shape of which is substantially ear-shaped in the bottom view in FIG. 7.

Furthermore, the embodiment according to the invention takes into account the fact that the supply line 40 "is immersed" in the adjustment arrangement 20 by a greater or lesser length depending on the rotational position of the two bogies 22, 30. To make this possible, a length adjustment path 62 is provided in the vehicle frame 12. In the embodiment shown, the supply line 40 passes through an opening 12a in the vehicle frame 12 in the region of this length adjustment path 62 and is guided along the vehicle frame 12 towards a further opening 12b in the vehicle frame 12 which is arranged above the adjustment arrangement 20. From here, the supply line 40 continues through the inside of the second bogie 30 and through an opening 38a in the adapter plate 38 into the inside of the first bogie 22 and extends from there towards the guide element 60, around at least part of said guide element, and on to the connection point 14a of the wheel assembly 14.

FIGS. 12a to 12d show the course of the supply line 40 in the four width adjustments of the heavy goods vehicle 10, respectively. In these figures, FIG. 12a corresponds to the first width adjustment according to FIG. 1, FIG. 12b corresponds to the second width adjustment according to FIG. 2, FIG. 12c corresponds to the third width adjustment according to FIG. 3, and FIG. 12d corresponds to the fourth width adjustment according to FIG. 4. In FIGS. 12a to 12d, it is easy to see that, in the first and fourth width adjustments (FIGS. 12a and 12d), the supply line 40 is immersed in the adjustment arrangement 20 by a shorter length than in the second and third width adjustments (FIGS. 12b and 12c). The length adjustment path 62 ensures that this is possible. In order to also ensure that the supply line 40 is retracted back into the length adjustment path 62 when transitioning from the third width adjustment according to FIG. 12c to the fourth width adjustment according to FIG. 12d for example, a tractive element 64 may also be provided, for example a helical tension spring, as can only be seen in FIG. 10. If the supply line 40 has sufficient inherent rigidity, it is also possible to dispense with this tractive element.

Figure 6:
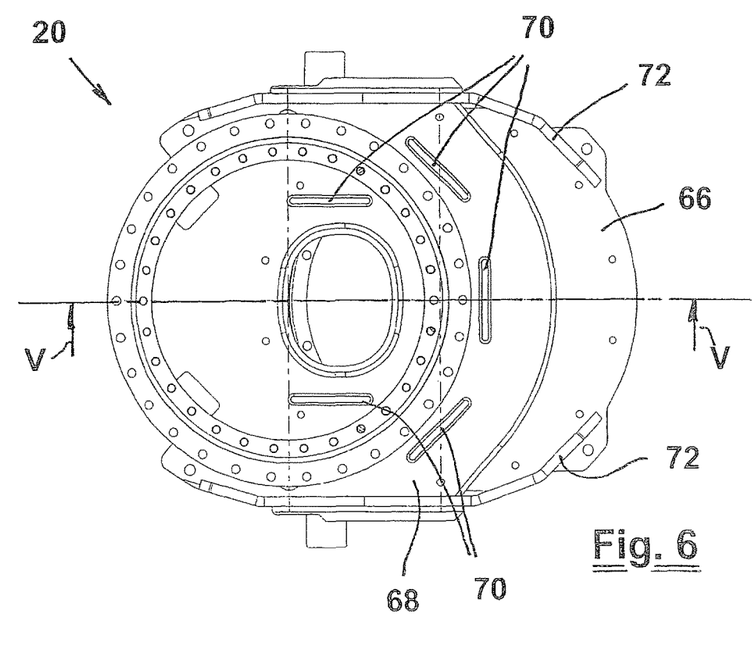
FIG. 6 is a plan view of the adjustment arrangement in FIG. 5.
Figure 7:
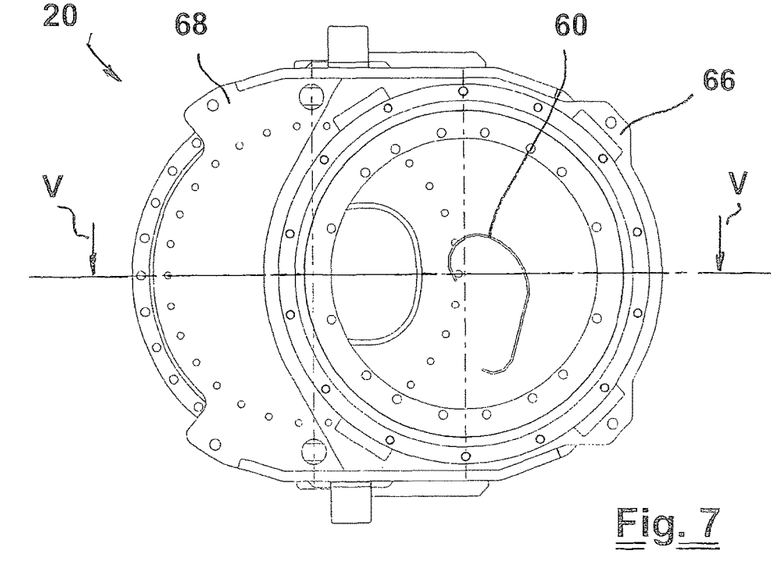
FIG. 7 is a bottom view of the adjustment arrangement in FIGS. 5 and 6.

With regard to the adapter plate 38, it should also be noted with reference to FIGS. 5 to 7 that said adapter plate can easily be produced from metal sheets, preferably steel sheets. In the shown embodiment, the adapter plate comprises two substantially planar metal sheet parts 66 and 68, one of which, namely the lower metal sheet part 66, is associated with the first bogie 22 and is used to fasten the rotary bearing 24 thereof, whereas the other, namely the upper metal sheet part 68, is associated with the second bogie 30 and is used to fasten the rotary plate 36 thereof. The two metal sheet parts 66, 68 are bonded to one another by welding. For it to be possible to weld the two metal sheet parts 66, 68 to one another not just at the edges thereof, slits 70 are made in the upper metal sheet part 68 through which the upper metal sheet part 68 can be welded to the lower metal sheet part 66. In the fully assembled state of the adapter plate 38, these slits 70 are filled completely with weld metal.

Given that the lower metal sheet part 66 is used to attach the first bogie 22, whereas the upper metal sheet part 68 is used to attach the second bogie 30, and that the two bogies 22, 30 are not congruent, but rather eccentrically arranged with respect to one another and thus only overlap, the metal sheet parts 66, 68 also overlap in order to save material. In order to nevertheless ensure both sufficient torsional rigidity and sufficient load bearing properties, metal stiffening plates 72 are provided which project from the face of the metal sheet parts 66, 68 which is on top in FIG. 5, extend along an edge portion of these metal sheet parts 66, 68 and are welded to these metal sheet parts 66, 68. The metal stiffening plates 72 are arranged on the surface of the metal sheet parts 66, 68 facing the second bogie 30 in order for there to be free lateral access to the first bogie 22 for the arrangement of steering arms 74 (see FIG. 10).

Figure 13A:
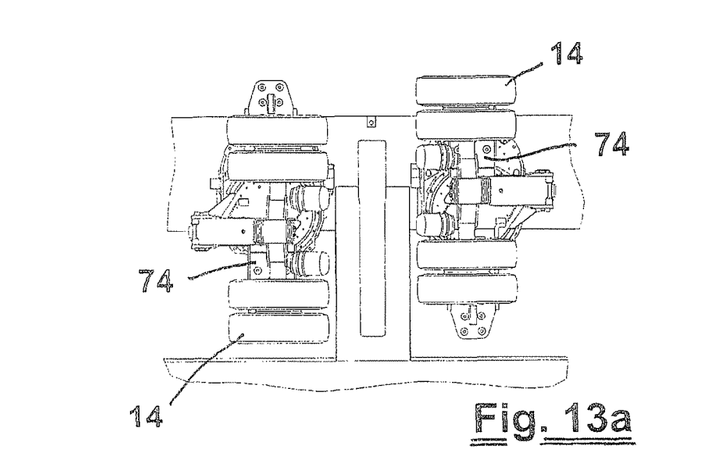
FIGS. 13a to 13d,
FIGS. 14a to 14d, and
FIGS. 15a to 15d are views showing the procedures for changing between the four different width adjustments.
Figure 13B:
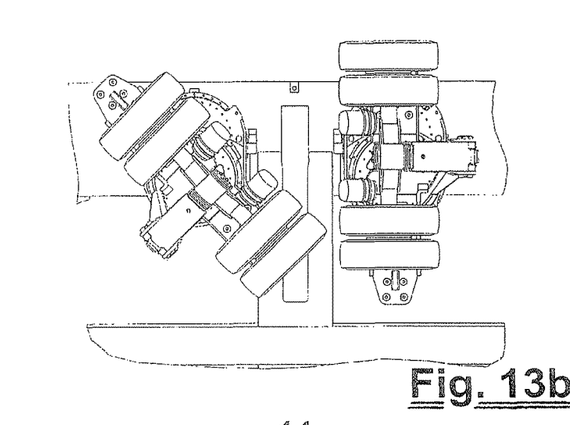
Figures 13C, 13D:
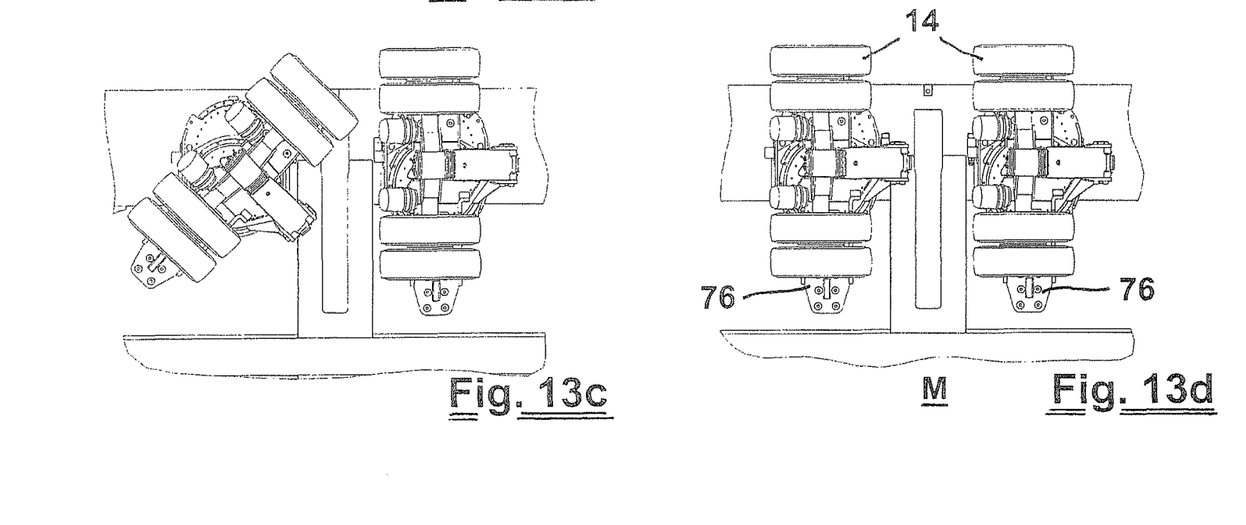
Figure 14A:
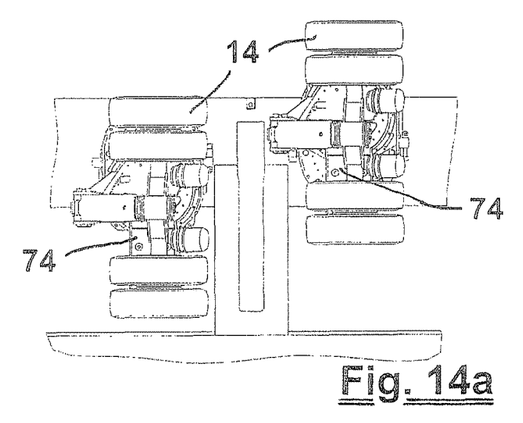
Figure 14B:
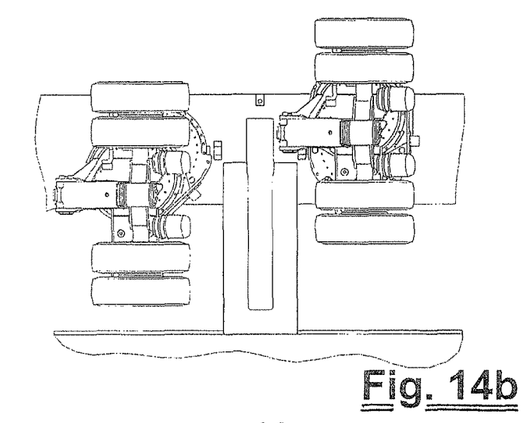
Figure 14C:
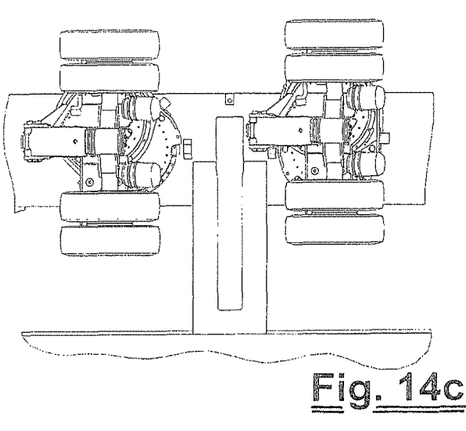
Figure 14D:
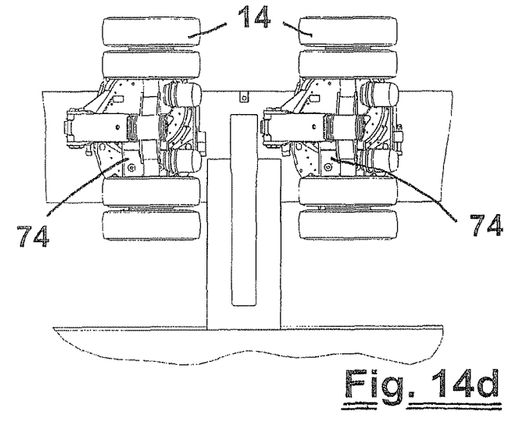
Figure 15A:
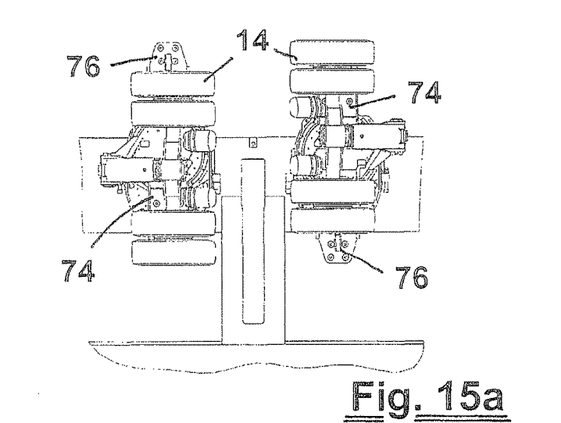
Figure 15B:
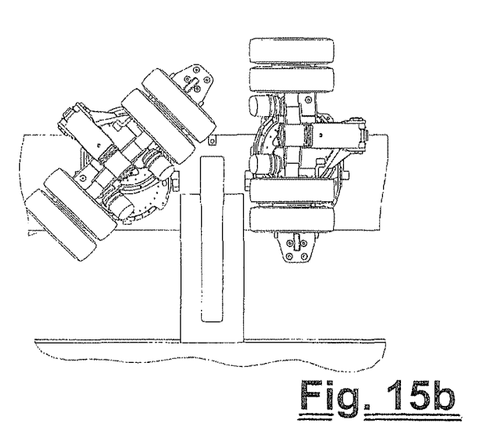
Figure 15C:
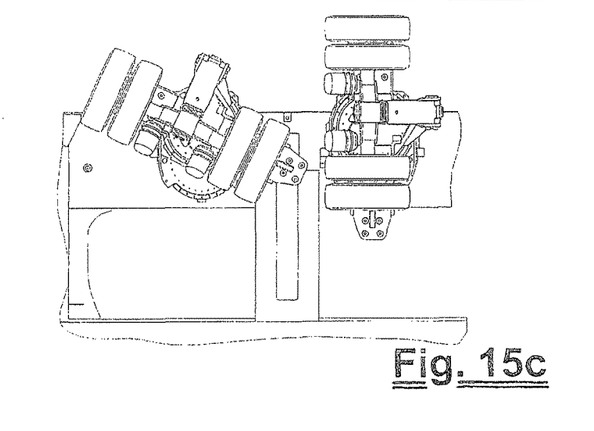
Figure 15D:
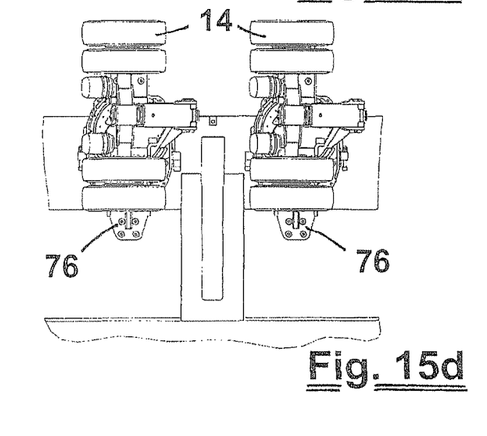

It should also be noted that FIGS. 13a to 13d, 14a to 14d and 15a to 15d are used to show the sequence of motions when transitioning from one width adjustment to another width adjustment, and more specifically by means of a sequence of images which starts with the initial state (FIGS. 13a, 14a and 15a) and ends with the end state (FIGS. 13d, 14d and 15d). In each of the figures, two wheel assemblies 14 are shown, of which the one on the right is already in the end state, whereas the one on the left is currently being adjusted.

In the figures, FIGS. 13a to 13d show the transition from the first width adjustment according to FIG. 1 to the second width adjustment according to FIG. 2. As preparation, the drag links (not shown) of the steering arms 74 are released so that the rotary plate 28 of the first bogie 22 can freely rotate relative to the rotary bearing 24 thereof. However, the second bogie 30 remains in the state in which it is locked by the locking device 50. Once the width has been adjusted by rotating the wheel assembly 14 by 180°, the drag links (not shown) are reconnected to the steering arms 76 pointing towards the centre M of the vehicle.

In conjunction with FIGS. 13a to 13d, it is noted that the embodiment according to the invention comprises two different types of steering arms, namely steering arms 74 which are permanently connected to the rotary plate 28 of the first bogie 22 and steering arms 76 which can be detachably connected to the rotary plate 28. The reason for having these two types of steering arms is as follows:

In the driving mode, the drag links (not shown) have to be arranged on the side facing the longitudinal centre M of the vehicle so as to reduce, or even eliminate, the risk of the steering means becoming damaged or unfit for use. In light of the rotations by 180° required to adjust the width, steering arms therefore have to be provided on either side of the wheel assemblies 14, on which steering arms the drag links (not shown) are able to engage. Owing to the axes of symmetry S of the wheel assemblies 14 being arranged eccentrically relative to the steering swivel axis X, this results in the steering arms projecting on one side thereof beyond the wheels 16 of the wheel assemblies 14. If, in the driving mode, this steering arm is on the outside of the heavy goods vehicle 10, the wheel assembly 14 is at risk of becoming damaged and people in the vehicle are at risk of becoming injured. In order to avoid these risks, these steering arms 76 can be detachably connected to the rotary plate 28, whereas the steering arms 74 that do not project beyond the wheels 16 are rigidly connected to the rotary plate 28.

FIGS. 14a to 14d show the transition from the first width adjustment according to FIG. 1 to the third width adjustment according to FIG. 3. As preparation, the drag links (not shown) are again released from the steering arms 74. Furthermore, the locking of the second bogie 30 is released. As a result, the two bogies 22, 30 can freely rotate so that the wheel assembly 14 can be drawn outwards in a simple manner while rotating the second bogie 30. Once the width has been adjusted, the drag links (not shown) are reconnected to the steering arms 74 pointing towards the centre M of the vehicle.

Finally, FIGS. 15a to 15d show the transition from the third width adjustment according to FIG. 3 to the fourth width adjustment according to FIG. 4. As preparation, the drag links (not shown) are released from the steering arms 74 so that the rotary plate 28 of the first bogie 22 can freely rotate relative to the rotary bearing 24 thereof. However, the second bogie 30 remains in state in which it is locked by the locking device 50. Once the width has been adjusted by rotating the wheel assembly 14 by 180°, the drag links (not shown) are reconnected to the steering arms 76 pointing towards the centre M of the vehicle.

The invention claimed is:
1. A heavy goods vehicle comprising
   a vehicle frame having longitudinal sides defining a width direction;

a bogie located between the longitudinal sides and comprising a wheel assembly;

said wheel assembly comprising a central axis, a wheel suspension and at least two wheels arranged symmetrically in relation to the central axis;

a rotary plate fastened to the wheel suspension and mounted on a rotary bearing of the bogie;

said rotary plate being rotatable about a steering swivel axis that is offset from the central axis of the wheel assembly, wherein the rotary bearing of the bogie is adjustable in the width direction and is detachably connected to the vehicle frame.

2. the heavy goods vehicle of claim 1, wherein the rotary bearing is fastened to an adapter plate that is mounted on the vehicle frame.

3. The heavy goods vehicle of claim 1, further comprising another bogie having a rotary plate and a rotary bearing, wherein the rotary plate of the other bogie defines an adjustable axis of rotation that is offset, in the width direction, from the central axis and the steering swivel axis.

4. The heavy goods vehicle of claim 3, wherein the bogie is connected to the other bogie via an adapter plate.

5. The heavy goods vehicle of claim 3, wherein a first distance between the central axis and the steering swivel axis is different than a second distance between the central axis and the adjustable axis of rotation.

6. The heavy goods vehicle of claim 5, wherein the second distance is double the first distance.

7. The heavy goods vehicle of claim 3, further comprising at least one of:
 a first rotation stop element adapted to limit rotational movement of the bogie; and
 a second rotation stop element adapted to limit rotational movement of the other bogie.

8. The heavy goods vehicle of claim 3, wherein the other bogie is lockable in one of:
 two rotational positions; and
 two relative rotational positions are separated from one another by 180°.

9. The heavy goods vehicle of claim 1, further comprising an adapter plate coupled to the bogie and comprising a through-opening and a guide element for at least one operating fluid supply line.

10. The heavy goods vehicle of claim 1, further comprising a length adjustment path arranged on the vehicle frame and usable for at least one operating fluid supply line.

11. The heavy goods vehicle of claim 10, further comprising a tension spring having one end coupled to the at least one operating fluid supply line and another end coupled to the vehicle frame.

12. The heavy goods vehicle of claim 3, wherein the other steering swivel axis extends through a through-opening in an adapter plate connecting the bogie to the other bogie.

13. The heavy goods vehicle of claim 12, wherein the adapter plate includes at least two metal sheet members that are welded to one another.

14. The heavy goods vehicle of claim 13, further comprising a stiffening rib coupled to one of the at least two metal sheet members.

15. The heavy goods vehicle of claim 12, wherein the adapter plate includes a first metal sheet member that is attached to the rotary bearing of the bogie and a second metal sheet member that is attached to the rotary plate of the other bogie.

16. The heavy goods vehicle of claim 12, wherein the adapter plate includes a first metal sheet member that is attached to the rotary bearing of the bogie and a second metal sheet member that wider in the width direction than the first sheet member and that is attached to the rotary plate of the other bogie.

17. A heavy goods vehicle comprising
 a vehicle frame having longitudinal sides defining a width direction;
 a bogie located between the longitudinal sides and comprising a wheel assembly;
 said wheel assembly comprising a central axis, a wheel suspension and at least two wheels arranged symmetrically in relation to the central axis;
 a rotary plate fastened to the wheel suspension and mounted on a rotary bearing of the bogie;
 said rotary plate being rotatable about a steering swivel axis that is offset from the central axis of the wheel assembly; and
 an adapter plate coupled to the rotary bearing and comprising at least two metal plate members that are welded to one another,
 wherein the rotary bearing of the bogie is adjustable in the width direction and is detachably connected to the vehicle frame.

18. The heavy goods vehicle of claim 17, further comprising a second bogie coupled to the adapter plate and being lockable in one of:
 two rotational positions; and
 two relative rotational positions are separated from one another by 180°.

19. A heavy goods vehicle comprising
 a vehicle frame having longitudinal sides defining a width direction;
 a first bogie located between the longitudinal sides and comprising a wheel assembly;
 said wheel assembly comprising a central axis, a wheel suspension and at least two wheels arranged symmetrically in relation to the central axis;
 a rotary plate fastened to the wheel suspension and mounted on a rotary bearing of the first bogie;
 said rotary plate being rotatable about a steering swivel axis that is offset from the central axis of the wheel assembly;
 a second bogie having a rotary plate and a rotary bearing, wherein the rotary plate of the second bogie defines an axis of rotation that is offset, in the width direction, from the central axis and the steering swivel axis of the first bogie; and
 an adapter plate connecting the first bogie to the second bogie.

20. The heavy goods vehicle of claim 19, wherein:
 the adapter plate comprises a first plate member and a second plate member with the first plate member being coupled to the rotary bearing of the first bogie and with the second plate member being coupled to the rotary plate of the second bogie; and
 the second bogie is lockable in one of:
 two rotational positions; and
 two relative rotational positions are separated from one another by 180°.

* * * * *